United States Patent [19]

Alexander

[11] Patent Number: 5,791,328
[45] Date of Patent: Aug. 11, 1998

[54] AIR VALVE FOR MARKING PELLET GUN

[76] Inventor: Aaron K. Alexander, 2445 N. Franklin Rd., Indianapolis, Ind. 46219

[21] Appl. No.: 805,009

[22] Filed: Feb. 24, 1997

[51] Int. Cl.$^6$ .............................. F41B 11/32; F16K 1/00; F16K 1/12; F16K 31/56

[52] U.S. Cl. .............................. 124/76; 124/73; 251/76; 251/176; 251/321

[58] Field of Search ................. 124/70, 73, 74, 124/76; 251/76, 66, 176, 186, 318, 321, 336, 357, 359, 366

[56] References Cited

U.S. PATENT DOCUMENTS

| | | | |
|---|---|---|---|
| 1,847,281 | 3/1932 | Uhri | 251/321 |
| 2,495,829 | 1/1950 | Vincent | 124/76 X |
| 2,568,308 | 9/1951 | Wells | 251/76 X |
| 2,594,185 | 4/1952 | Lefever | 124/76 X |
| 3,067,730 | 12/1962 | Merz | 124/73 X |
| 3,177,863 | 4/1965 | Spack | 124/76 |
| 3,527,194 | 9/1970 | Vadas et al. | 124/76 |
| 3,612,026 | 10/1971 | Vadas et al. | 124/76 |
| 5,363,834 | 11/1994 | Stuchlik | 124/76 |

*Primary Examiner*—John A. Ricci

[57] ABSTRACT

A valve, especially for use in a paintball gun which includes a pressure chamber bore for receiving gas from a source, an exhaust bore which leads to a barrel, and a valve chamber bore between the pressure chamber bore and exhaust bore. The valve includes a body mounted in the valve chamber bore with a flow path between the pressure chamber and exhaust bores, and a cupseal seat on the upstream side of the flow path. A valve stem passes through a portion of the flow path and is slidably supported by a support nose, and presents an actuation surface at one end, and supports a cupseal to mate with the seat at the other end. The cupseal has radial guide legs to closely and slidably contact the pressure chamber bore to aid alignment. The cupseal will normally be held against the seat by gas pressure and/or a spring; to open the valve, the gun may be provided with a hammer which is released to strike the actuation surface of the valve stem, to unseat the cupseal and allow gas to flow into the barrel.

11 Claims, 7 Drawing Sheets

AIR VALVE FOR MARKING PELLET GUN

BACKGROUND (FIELD OF INVENTION)

This invention relates generally to gas-powered guns suitable for projecting lightweight projectiles, and specifically, to gas powered guns suitable for projecting paintballs. More specifically, a valve that releases a precise volume of air or gas to propel paintballs.

BACKGROUND

Various types of paintball guns have been developed for use in various ways, such as in simulated war games or marking trees and cattle. These paintball guns generally include a CO2 cartridge, or a refillable cylinder which is utilized as a power source to propel paint balls, generally at a specific velocity, usually no higher than 300 feet per second. In general, the prior art paintball guns include a bolt, hammer, hammer spring, cocking handle, barrel, power source, and an air release valve.

The problem occurs in the valve for releasing air to propel the paintball. Generally the prior art valves used on paintball guns are valves derived from BB guns and use CO2 for a propellant gas, and high spring tension to keep the valve closed and to adjust velocity. This valve design dates back to the 1950's and earlier and was used by Benjamin Air Rifle Company in all their BB guns (as in U.S. Pat. No. 3,177,863) and are still used today in their BB guns and paintball guns. The valve bodies generally do not fit very well into the pressure chamber bore of paintball guns which mis-aligns the valve body from the stem and causes excessive wear which causes the valve stem to wobble when opened by the hammer. Since the valves are generally constructed of brass they wear out from the higher stress put on them from paintball guns. The cupseal is also a concern since it is generally made from a soft rubber material. The cupseal is generally not secured in place, but floats within the confines of the holding device on the stem. The cupseal has a tendency to separate from the stem due to the wobble of the stem which does not seat it squarely and causes it to mis-align. When the cupseal fails this leads to a "blown seal" and stops the paintball gun from working.

The actions of the valve in prior art having a wobble and wearing out causes inconsistent velocity and loss of efficiency. To make the problem worse, the velocity is adjusted by raising the spring tension on the hammer. Heavy spring tensions are used to propel the hammer against the valve to open the valve both a greater distance and for a longer period of time releasing a larger quantity of air/gas, thus raising the velocity but lowering the efficiency. With the action of the valve being wobbly and causing excessive wear and with a varying spring tension, the velocity could easily climb above the safe limits of 300 feet per second.

This problem was accentuated when paintball guns switched from using CO2 to using nitrogen and compressed air as propellants. The efficiency dropped further.

What is needed is a valve that works on multi-fuels, has a smooth action, cannot become misaligned when in operation, has better construction, less cupseal wear, more consistent velocities, is more efficient, securely holds the cupseal, and allows velocity to be set using air pressure instead of raising the hammer spring tension.

Most previous valves were designed for CO2 but with a change to high pressure gas, compressed air or nitrogen, all previous valves dropped in efficiency. This valve corrects this problem and the problems of valve failure so that paintball guns using high pressure gas, compressed air and nitrogen can get better efficiency and more consistent shots and longer life from the valve.

SUMMARY OF INVENTION

The present invention accomplishes these objectives by providing a valve that can release an air/gas used to propel a projectile by a gas powered gun and reduce the failure rate of valve. This valve is made up of a valve body through which the gas flows. A valve stem which slides inside the bore of the valve body when energy is imparted on the stem from a hammer/striker. A cupseal which seals the air/gas inside the pressure chamber and keeps the valve stem from misalignment with the pressure chamber bore. A cupseal retaining device which keeps the cupseal on the valve stem. Each of these aspects is discussed in the order mentioned above.

The valve body has increased and smoother airflow from the use of a large inlet and exhaust port, a curved airflow transition path instead of a 90 degree right angle path, and a new valve stem design, which results in shorter valve open time and disruption of air/gas flow which decreases the amount of air/gas needed to flow through the valve to do the same work as before.

The valve body also has a longer nose length to increase stem-bearing surface and a tighter tolerance of the valve stem bore. This provides less valve stem movement away from the valve body centerline, and less air/gas escaping around the valve stem and nose of the valve body when in the open position. A larger valve body diameter to better fit the bore of the paintball gun and enhance valve body concentricity with the pressure chamber bore, valve return spring and valve stem. This reduces the wear on the valve and cupseal. A new O-ring seal and cupseal seating area allows more air/gas to be stacked in front of the cupseal than before so more air/gas can rush in as soon as the valve opens which shortens the time the valve must stay open.

The valve stem design has a two-stage stepped diameter. The first diameter which is the largest and fits into the valve body bore, has a groove turned into it for grease to be packed into it for better lubrication as the stem slides within the valve body bore. The smaller diameter allows for additional volume of air/gas flow through the valve body passage way.

The cupseal has been redesigned to perform several jobs besides sealing the air/gas in the pressure chamber. The cupseal is now made from modern materials to increase life-span over older soft materials. The cupseal now has integrated into its shape, guide legs which project from the cupseal and come in close proximity to the pressure chamber bore. Three through ten cupseal guide legs can be manufactured into the cupseal to help vary valve stem closing speed since they give more area for air to push against. The legs also help keep the stem on center-line with the valve body, pressure chamber bore and the return spring as it slides back and forth. This reduces cupseal and stem wear as the cupseal now seats flat after each opening and does not move off-center when in the open position. This also prevents the valve stem from sticking open by being pushed to one side by the return spring in the open position and altering the velocity.

The cupseal retaining device is now a separate piece from the stem and has a larger flange diameter that holds the cupseal down on the stem with more surface area when the locking collar is pressed on. This new collar prevents the cupseal from separating from the stem and causing a "blown seal" which results in failure of the valve.

DETAILED DESCRIPTION OF THE INVENTION

Figure 1:
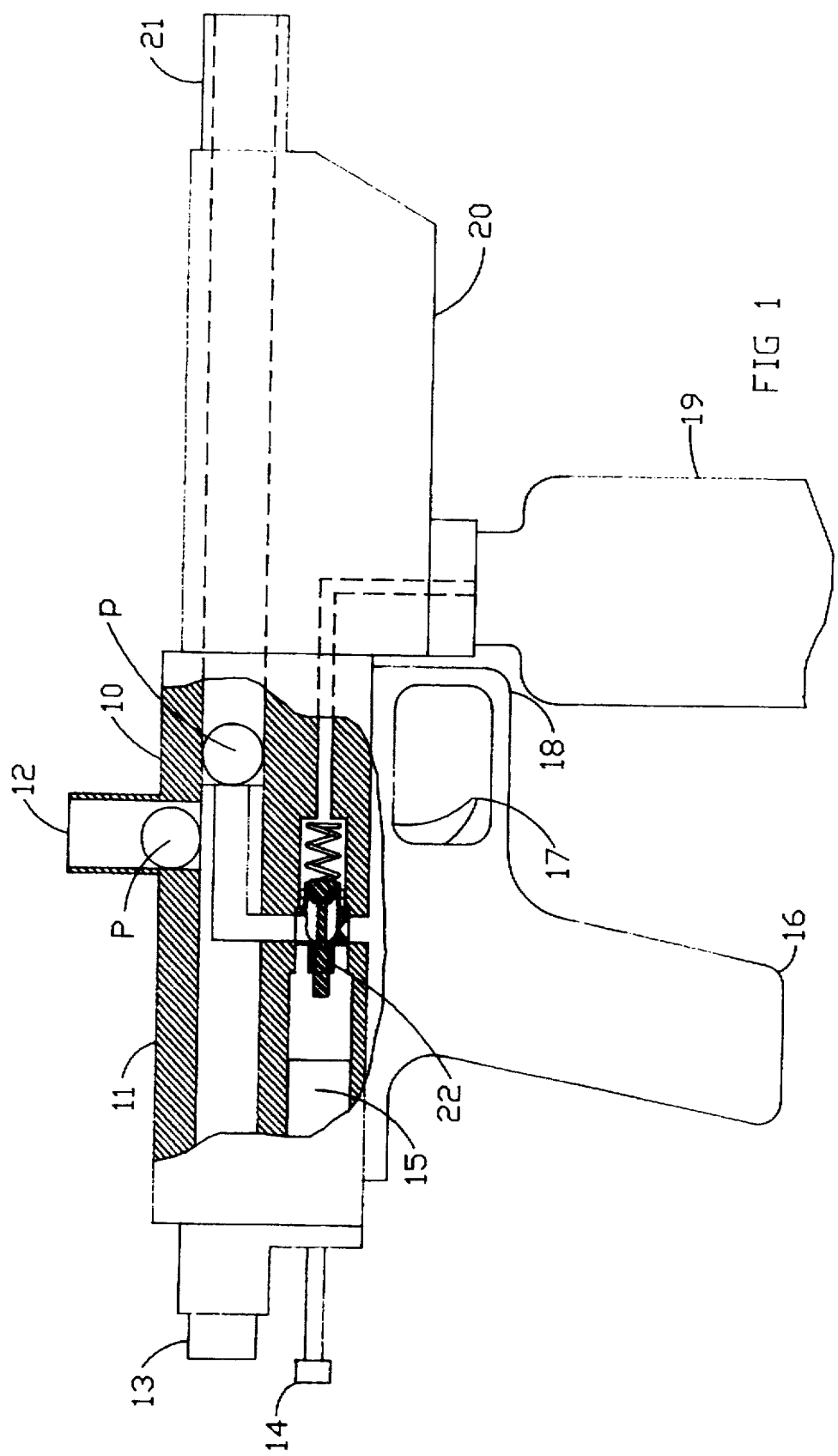
FIG. 1 is a side elevation view, partially in section and partly broken away, showing a compressed gas powered gun and the preferred embodiment of the valve in the closed position.
Figure 2:
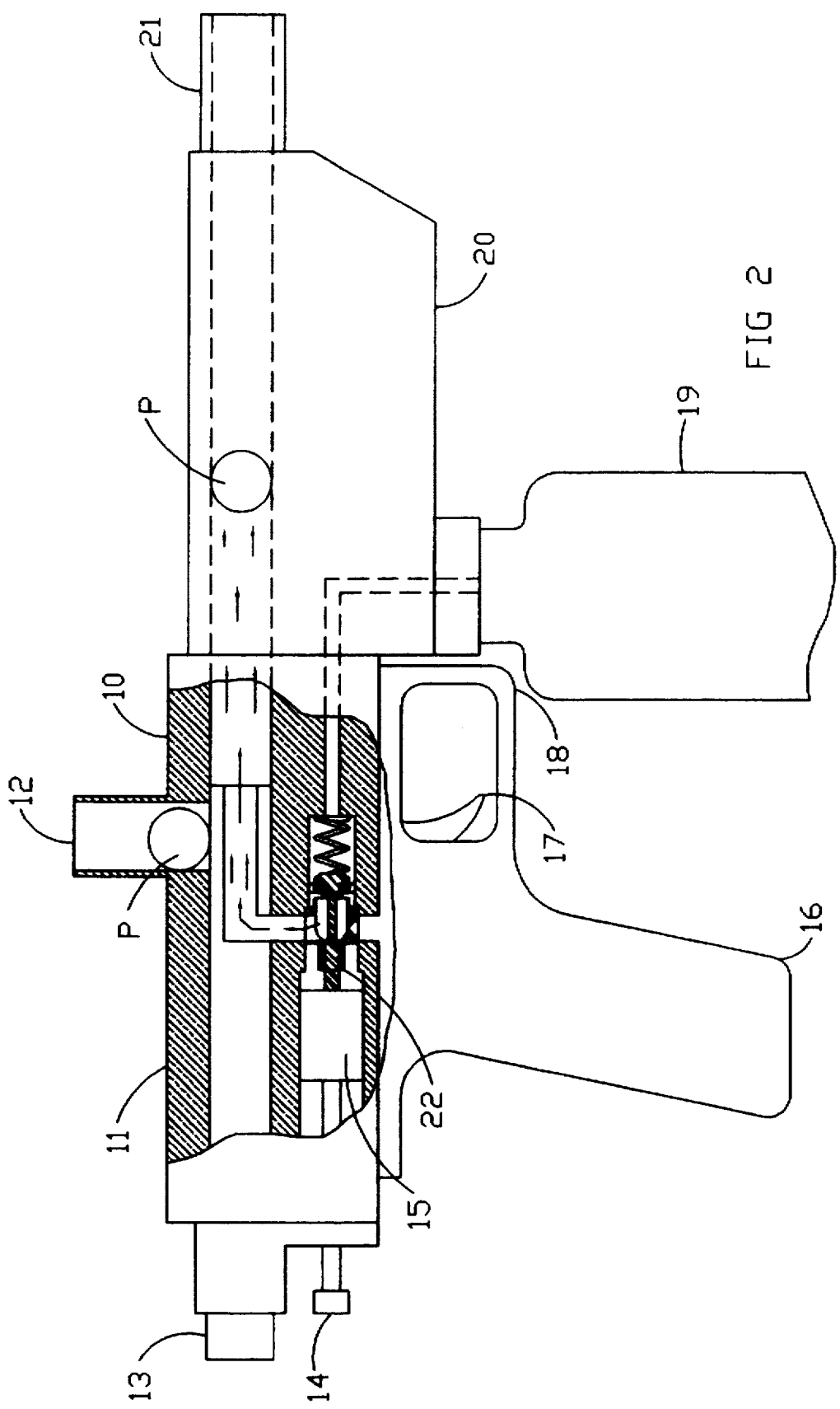
FIG. 2 is a view similar to FIG. 1, but showing the valve being opened by the hammer and releasing gas to propel a paintball.

Referring now to FIGS. 1 and 2 of the drawings, many parts of the compressed gas-powered gun are conventional; and are shown only to the extent necessary for an understanding of the present invention. Thus, the gun (10) is seen as including a main body (11) with feeder tube (12) which acts as a conventional magazine to feed fragile projectiles (P) such as paintballs, bolt (13), cocking rod (14), hammer (15), receiver (16) for the body of the gun, trigger (17), trigger guard (18), compressed gas source (19), and forward grip (20), barrel (21), and valve (22).

FIG. 1 shows the valve (22) in a closed position with hammer (15) in the cocked position and a paintball (P) loaded.

FIG. 2 shows the valve (22) opened by the hammer (15), releasing air to propel the paintball (P).

The forgoing problem is overcome by the new valve assembly of the present invention illustrated in greater detail in FIGS. 3 thru 7.

Figure 3:
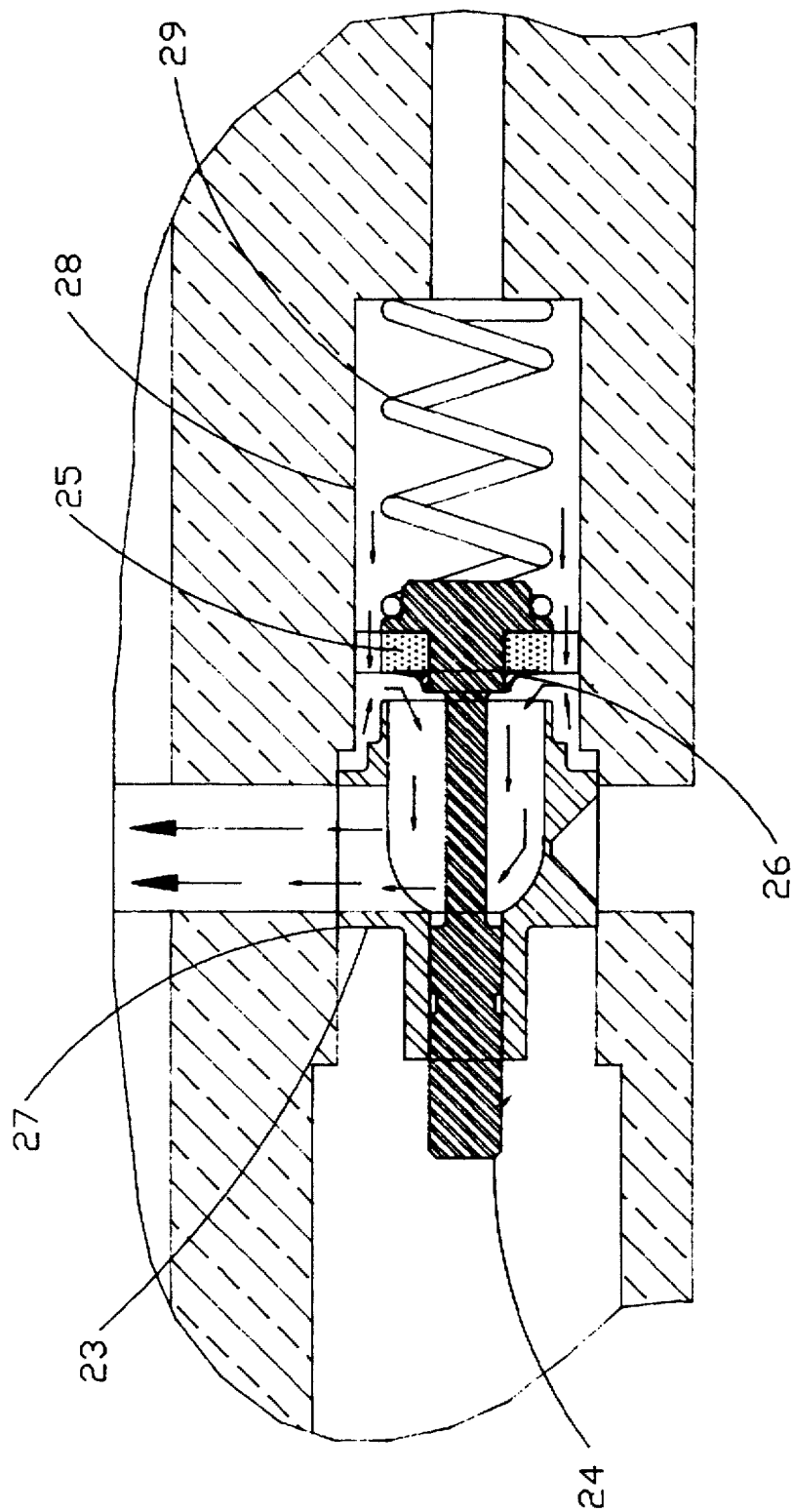
FIG. 3 is a cross-sectional view of an assembled valve inside the pressure chamber and valve chamber bore with a return spring on the valve.

Referring to FIG. 3 shows a cross-sectional view of the assembled valve in the open position to show the major components of the valve. The valve body (23), valve stem (24), cupseal (25), and cupseal retaining collar (26). FIG. 3 also shows the air/gas flow path around the cupseal and through the valve body. When the valve is placed inside the valve chamber bore (27) and pressure chamber bore (28) with a valve return spring (29).

Figure 4:
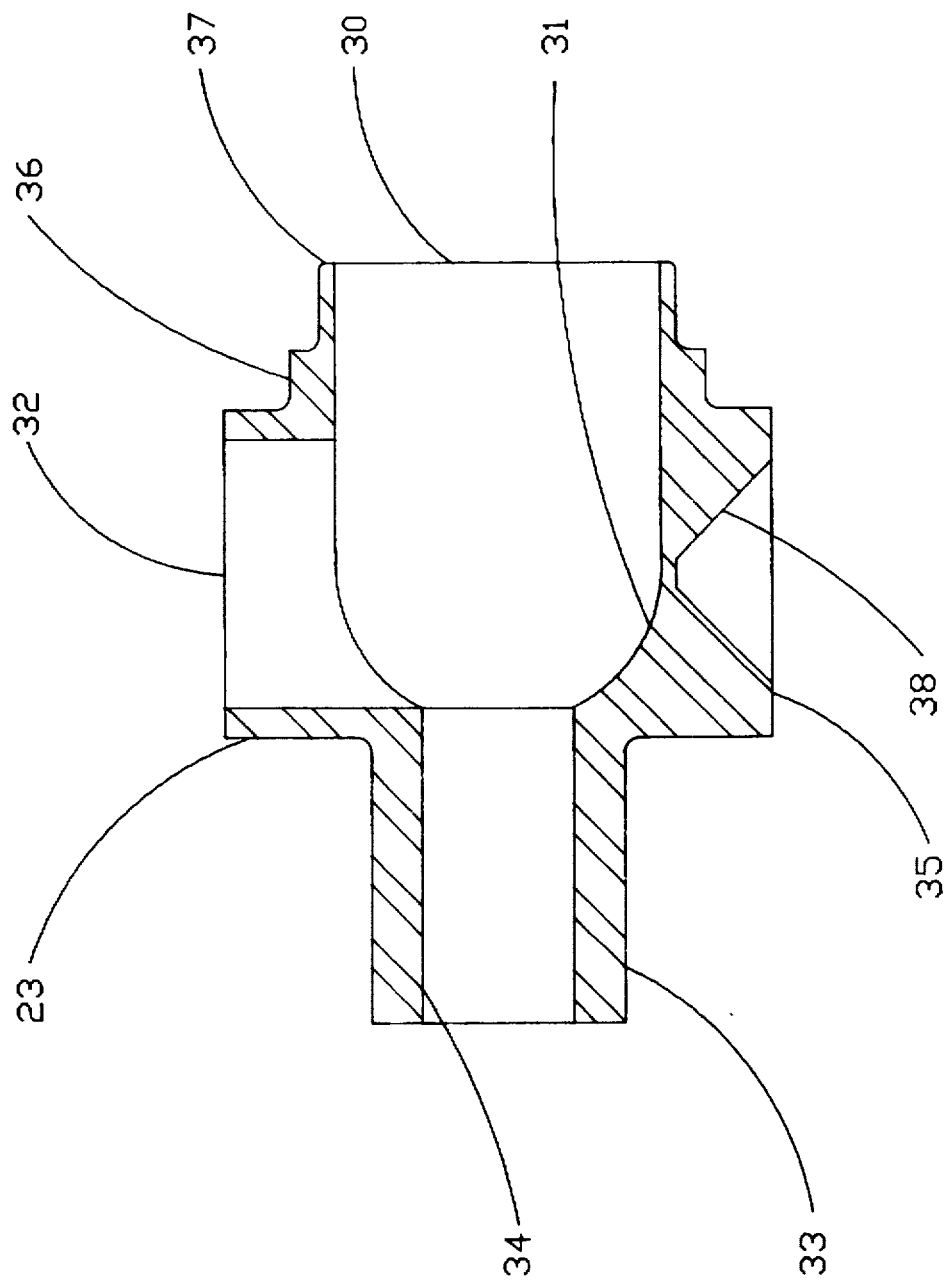
FIG. 4 is a cross-sectional view of the valve body.

Now, referring to FIG. 4 which has a view of the valve body (23) showing the larger air/gas inlet (30) leading to the curved gas flow transition path (31) and out the larger exhaust port (32). The front section of the valve body (23) has a lengthened support nose (13) and a tighter tolerance on the nose bore (34) which the valve stem (24) rides. This reduces valve stem (24) movement off the valve body (23) centerline. Valve body (23) has a larger outside diameter (35) to better fit the valve chamber bore of the paintball gun. The rear end of the valve body (23) has had the o-ring seat redesigned to the new configuration of the o-ring seat (36) area to stack more air/gas in front of the redesigned cupseal seat area (37). The valve body (23) uses an alignment set screw hole (38) to keep the exhaust port (32) in line with the bolt in the paintball gun.

Figure 5:
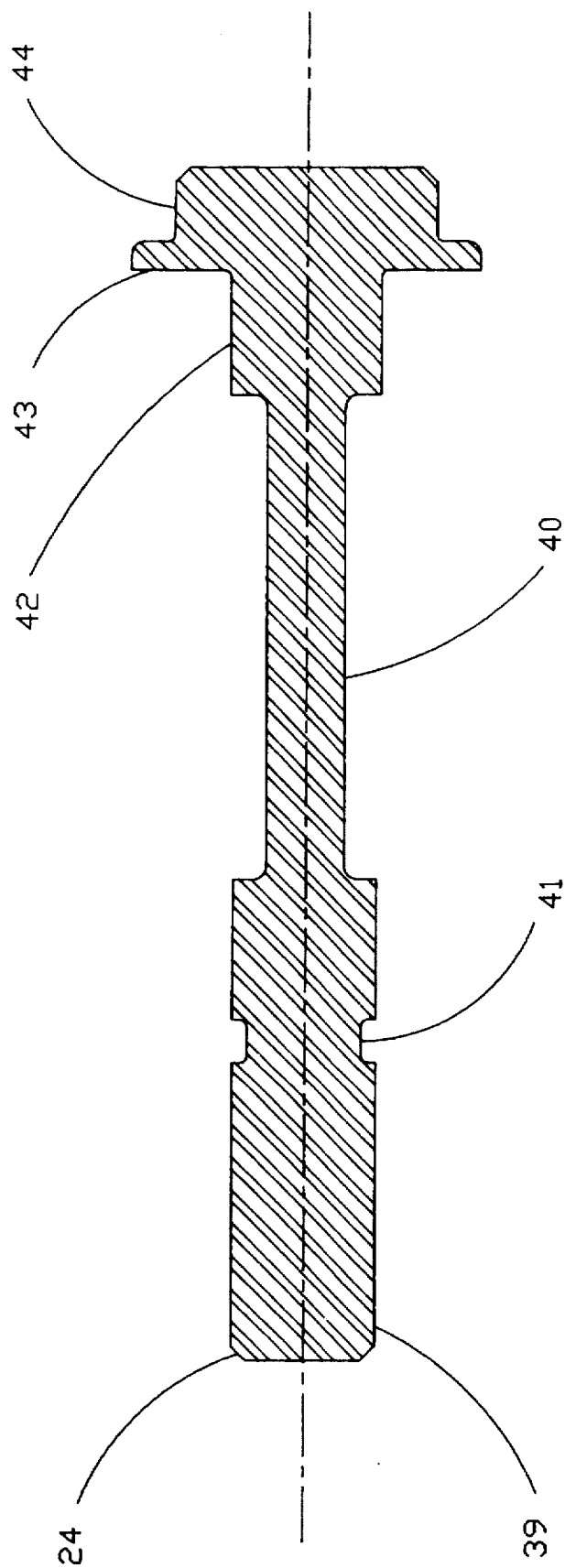
FIG. 5 is a cross-sectional view of the valve stem.

Referring to FIG. 5 which shows the valve stem (24) with stem surface (39) which rides in the tighter valve body bore (34) of the longer valve body nose (33). To lubricate the bore (34) and the valve stem surface (39) a groove (41) has been added so grease can be packed into the groove. Valve stem surface area (40) has been reduced from the stem diameter (39) to increase air/gas flow area of the large inlet port (30).

Moving back along stem surface (40) there is the retaining collar (26) and cupseal (25) locating surface (42) which holds the cupseal (25) in place when the retaining collar (26) is pressed on surface (42) and holds the cupseal (25) securely between surfaces (47) of the retaining collar and surface (43) of the valve stem (24). While area (44) is the seat for a valve return spring.

Figure 6:
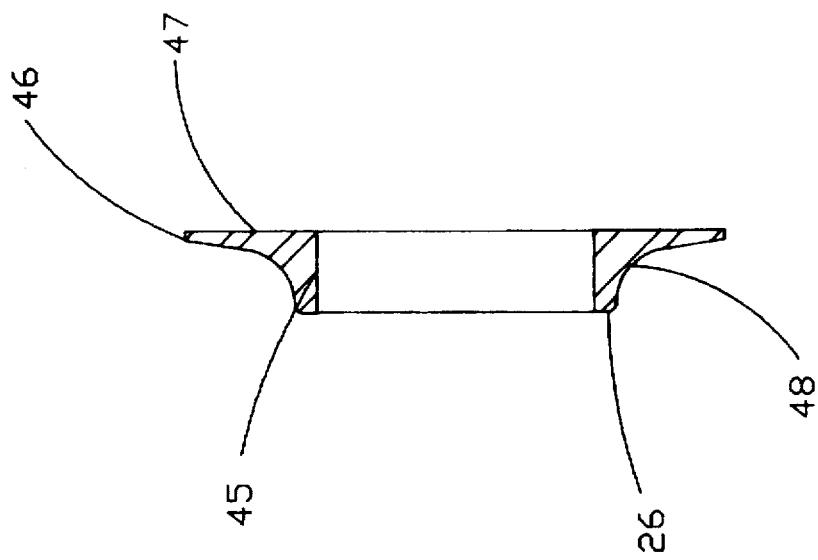
FIG. 6 is a cross-sectional view of the cupseal retaining collar.

FIG. 6 shows a cross-sectional drawing of the retaining collar (26) which securely hold the cupseal (25) in place on stem surface (42). The cupseal (25) is held down against surface (43) by the retaining collar's larger diameter (46) which increased the rear surface area (47) of the retaining collar. The reduced area (48) of the retaining collar is for uninterrupted and smooth airflow into valve body inlet port (30) when the valve is open.

Figure 7:
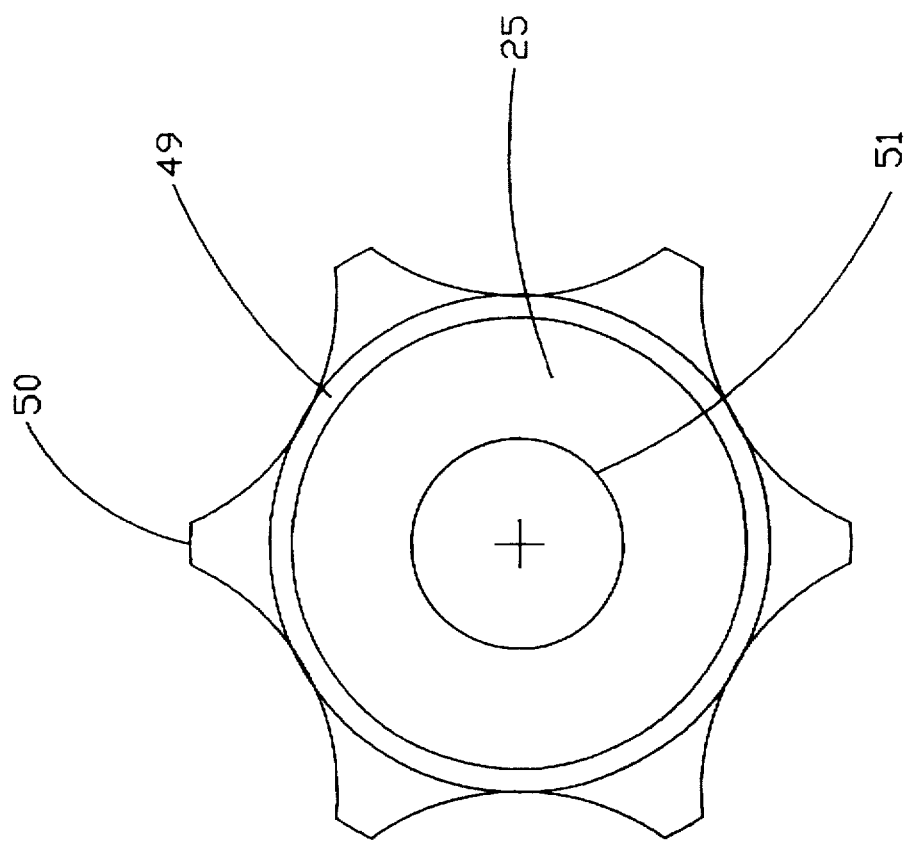
FIG. 7 is a frontal view of the cupseal showing the preferred embodiment of the cupseal and of the cupseal guide legs.

FIG. 7 shows a frontal view of cupseal (25) which sits on surface (42) with the use of hole (51) and held in place by retaining collar (26) and surface (43) of the valve stem. Ring (49) shows the area where surface (37) of the valve body seals against the cupseal. The integrated cupseal guide legs (50) are used to keep the stem (24) from becoming misaligned with the valve body bore (34), the pressure chamber (28), and the valve return spring (29). The cupseal guide legs (50) also increase the surface area for more air to push against the cupseal to close the valve quicker to reduce the time the valve stays open. Since the guide legs (50) close the valve quicker and cause the valve stem to act as a piston, the velocity can now be set by varying air pressure instead of spring tension on the hammer.

It should be obvious that changes, addition, and omissions may be made in the details and arrangement of parts without departing from the spirit and scope of the invention.

I claim:

1. For installation in a fluid operated device which comprises a pressure chamber bore, an exhaust bore, and a valve chamber bore in communication with said pressure chamber bore and said exhaust bore, a valve for controlling passage of pressurized fluid from said pressure chamber bore to said exhaust bore, said valve comprising:

a valve body mountable in said valve chamber bore, said valve body comprising a fluid intake port for communication with said pressure chamber bore, an exhaust port for communication with said exhaust bore, and a flow path connecting said intake port and said exhaust port, a cupseal seat on said fluid intake port, said valve body further comprising a support nose with an internal nose bore;

a valve stem slidably received in said nose bore and extending through said flow path and through and beyond said intake port, the portion of said valve stem which extends beyond said intake port including means for mounting a cupseal for engagement with said cupseal seat to block fluid passage from said pressure chamber bore into said valve body;

said cupseal having formed thereon a plurality of guide legs extending radially outward and sized to closely and slidably contact walls of said pressure chamber bore, to aid in alignment of said cupseal to said cupseal seat.

whereby pressurized fluid in said pressure chamber bore will tend to push increasingly on said cupseal configuration as more guidelegs are added for engagement with said cupseal seat to block fluid flow, and said valve stem may be pushed to unseat said cupseal from said cupseal seat to allow said pressurized fluid to flow through said flow path to said exhaust port.

2. The valve of claim 1, in which said valve stem extends away from said valve body and beyond said nose bore, presenting a surface which is strikable by an actuator to slide said valve stem.

3. The valve of claim 1 in which said valve body includes a surface engageable by a set screw for mounting said valve in said valve chamber bore.

4. The valve of claim 1 in which said flow path comprises a curved flow transition path.

5. The valve of claim 1 further comprising means for normally biasing said cupseal into engagement with said cupseal seat.

6. The valve of claim 5, in which the portion of said valve stem which extends beyond said intake port includes a surface for receiving said biasing means, said biasing means mountable between said valve stem and a wall of said pressure chamber bore.

7. The valve of claim 1, in which the portion of said valve stem which extends through said flow path has a reduced diameter to reduce interference with fluid flow.

8. The valve of claim 1 in which the portion of said valve stem which extends beyond said intake port includes a cupseal mounting surface, and said means for mounting said cupseal includes a retaining collar for retaining said cupseal on said mounting surface.

9. The valve of claim 1, in which the portion of said valve stem within said nose bore includes at least one groove into which lubricant may be received, to reduce sliding friction.

10. A gun for propelling projectiles by means of fluid pressure, comprising:

a pressure chamber bore connectable to a source of fluid pressure;

an exhaust bore in communication with a barrel through which projectiles are propelled;

a valve chamber bore in communication with said pressure chamber bore and said exhaust bore;

a valve mounted in said valve chamber bore for controlling release of pressurized fluid from said pressure chamber bore to said exhaust bore, said valve comprising:

a valve body mountable in said valve chamber bore, said valve body comprising a fluid intake port for communication with said pressure chamber bore, an exhaust port for communication with said exhaust bore, and a flow path connecting said intake port and said exhaust port, a cupseal seat on said fluid intake port, said valve body further comprising a support nose with an internal nose bore;

a valve stem slidably received in said nose bore and extending through said flow path and through and beyond said intake port, the portion of said valve stem which extends beyond said intake port including means for mounting a cupseal for engagement with said cupseal seat to block fluid passage from said pressure chamber bore into said valve body;

said cupseal having formed thereon a plurality of guide legs extending radially outward and sized to closely and slidably contact walls of said pressure chamber bore, to aid in alignment of said cupseal to said cupseal seat, whereby pressurized fluid in said pressure chamber bore will tend to push increasingly on said cupseal configuration as more guidelegs are added for engagement with said cupseal seat to block fluid flow;

trigger means for pushing said valve stem to unseat said cupseal from said cupseal seat to allow said pressurized fluid to flow through said flow path to said barrel.

11. The gun of claim 10, in which said valve stem extends away from said valve body and beyond said nose bore, and said gun includes a hammer means for striking said valve stem to unseat said cupseal from said cupseal seat, and said trigger means includes means to release said hammer means to strike said valve stem.

* * * * *